United States Patent
Chang

(10) Patent No.: US 12,283,274 B2
(45) Date of Patent: Apr. 22, 2025

(54) VOICE CONTROL SYSTEM AND VOICE CONTROL METHOD FOR AUTOMATIC DOOR

(71) Applicant: PEGATRON CORPORATION, Taipei (TW)

(72) Inventor: Shun-Chieh Chang, Taipei (TW)

(73) Assignee: PEGATRON CORPORATION, Taipei (TW)

(*) Notice: Subject to any disclaimer, the term of this patent is extended or adjusted under 35 U.S.C. 154(b) by 367 days.

(21) Appl. No.: 18/083,684

(22) Filed: Dec. 19, 2022

(65) Prior Publication Data

US 2023/0215434 A1 Jul. 6, 2023

(30) Foreign Application Priority Data

Jan. 3, 2022 (TW) ................................. 111100016

(51) Int. Cl.
| | | |
|---|---|---|
| *G10L 15/22* | (2006.01) | |
| *E05F 15/73* | (2015.01) | |
| *G06F 21/32* | (2013.01) | |
| *G10K 11/178* | (2006.01) | |

(52) U.S. Cl.
CPC .............. *G10L 15/22* (2013.01); *E05F 15/73* (2015.01); *G06F 21/32* (2013.01); *G10K 11/17823* (2018.01); *E05F 2015/763* (2015.01); *G10K 2210/3218* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 9,491,033 B1* | 11/2016 | Soyannwo | H04L 67/141 |
| 9,691,199 B1* | 6/2017 | Rapp | G07C 9/00571 |
| 12,085,329 B2* | 9/2024 | Cho | F25D 23/028 |
| 2003/0018478 A1* | 1/2003 | Mays | G10L 15/26 |
| | | | 704/E15.045 |

(Continued)

FOREIGN PATENT DOCUMENTS

| | | |
|---|---|---|
| CN | 205823022 U | 12/2016 |
| CN | 206801320 U | 12/2017 |

(Continued)

*Primary Examiner* — Jonathan C Kim
(74) *Attorney, Agent, or Firm* — Li & Cai Intellectual Property (USA) Office

(57) ABSTRACT

A voice control system and a voice control method for an automatic door are provided. The voice control system includes a sound detection device, a storage device, a first determination circuit, a second determination circuit and a control circuit. The sound detection device detects a sound signal of a sound source, the storage device includes a voiceprint database that includes reference voiceprint features. The first determination circuit analyzes a voiceprint feature of the sound signal and compares the voiceprint feature with the reference voiceprint features. The second determination circuit determines whether a velocity of the sound source falls within a reference speed range according to a frequency variation of the sound signal that matches one of the voiceprint features. In response to the velocity of the sound source within the reference speed range, the control circuit controls the automatic door to be in an open state.

9 Claims, 10 Drawing Sheets

(56) References Cited

U.S. PATENT DOCUMENTS

| | | | | |
|---|---|---|---|---|
| 2004/0220798 | A1* | 11/2004 | Chi | G10L 17/22 |
| | | | | 704/E17.015 |
| 2013/0289999 | A1* | 10/2013 | Hymel | G10L 21/0208 |
| | | | | 704/273 |
| 2014/0278389 | A1* | 9/2014 | Zurek | G10L 15/20 |
| | | | | 704/231 |
| 2015/0097651 | A1* | 4/2015 | Clough | G07C 9/00182 |
| | | | | 340/5.7 |
| 2015/0106105 | A1* | 4/2015 | Clough | G07C 9/30 |
| | | | | 704/275 |
| 2017/0150254 | A1* | 5/2017 | Bakish | H04R 3/005 |
| 2017/0186428 | A1* | 6/2017 | Kunitake | G10L 17/06 |
| 2018/0047393 | A1* | 2/2018 | Tian | G10L 17/06 |
| 2019/0162811 | A1* | 5/2019 | Qiao | G01S 3/802 |
| 2019/0204907 | A1* | 7/2019 | Xie | G06F 3/017 |
| 2020/0035248 | A1* | 1/2020 | Torfs | G01S 5/18 |
| 2020/0152206 | A1* | 5/2020 | Shen | G10L 17/06 |
| 2020/0184963 | A1* | 6/2020 | Joseph | G10L 15/22 |
| 2020/0202866 | A1* | 6/2020 | Langenberg | G07C 9/25 |
| 2020/0251104 | A1* | 8/2020 | Smith | G10L 15/20 |
| 2020/0294533 | A1* | 9/2020 | Shen | G06F 3/0487 |
| 2021/0125444 | A1* | 4/2021 | Terry | G07C 9/28 |
| 2021/0142814 | A1* | 5/2021 | Chiu | G06V 40/166 |
| 2021/0398528 | A1* | 12/2021 | Kim | G10L 15/22 |
| 2022/0097960 | A1* | 3/2022 | Yang | G10L 25/51 |
| 2022/0319261 | A1* | 10/2022 | Dabel | G10L 25/51 |
| 2023/0215434 | A1* | 7/2023 | Chang | G01S 11/14 |
| 2023/0333205 | A1* | 10/2023 | Ying | G10L 21/0216 |

FOREIGN PATENT DOCUMENTS

| | | |
|---|---|---|
| CN | 111354369 A | 6/2020 |
| CN | 113096272 A | 7/2021 |
| CN | 113530397 A | 10/2021 |
| CN | 113539263 A | 10/2021 |

* cited by examiner

VOICE CONTROL SYSTEM AND VOICE CONTROL METHOD FOR AUTOMATIC DOOR

CROSS-REFERENCE TO RELATED PATENT APPLICATION

This application claims the benefit of priority to Taiwan Patent Application No. 111100016, filed on Jan. 3, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a voice control system and a voice control method, and more particularly to a voice control system and a voice control method for an automatic door.

BACKGROUND OF THE DISCLOSURE

Radar-sensing automatic doors and infrared-sensing automatic doors are two types of automatic doors commonly available on the market.

For the radar-sensing automatic doors that are used in shopping malls, high-sensitive radar modules thereof may be mistakenly triggered by crowds and busy shoppers, resulting in automatic doors frequently opening and closing. On the other hand, the infrared-sensing automatic doors installed in shopping malls, despite being less sensitive, may also be mistakenly triggered since infrared rays used for detection are easily absorbed by objects made of certain materials.

SUMMARY OF THE DISCLOSURE

In response to the above-referenced technical inadequacies, the present disclosure provides a voice control system and a voice control method for an automatic door.

In one aspect, the present disclosure provides a voice control system, which includes a sound detection device, a storage device, a first determination circuit, a second determination circuit, and a control circuit. The storage device includes a voiceprint database, which includes a plurality of reference voiceprint features. The first determination circuit is electrically connected to the storage device and the sound detection device, and is configured to analyze a voiceprint feature of the sound signal and compare the voiceprint feature with the reference voiceprint features, so as to determine whether or not the voiceprint feature matches one of the plurality of reference voiceprint features. The second determination circuit is electrically connected to the first determination circuit, and is configured to determine whether or not a velocity of the sound source falls within a reference speed range according to a frequency variation of the sound signal that matches at least one of the voiceprint features. In response to the velocity of the sound source within the reference speed range, the control circuit controls the automatic door to be in an open state.

In another aspect, the present disclosure provides an voice control method for an automatic door, and the voice control method includes: detecting a sound signal of a sound source; determining whether or not a voiceprint feature of the sound signal matches one of the plurality of reference voiceprint features; in response to the voiceprint feature of the sound signal matching at least one of the plurality of reference voiceprint features, determining whether or not a velocity of the sound source falls within a reference speed range according to a frequency variation of the sound signal; and in response to the velocity of the sound source within the reference speed range, controlling the automatic door to be in an open state.

Therefore, in the voice control system and the voice control method provided by the present disclosure, whether to open the automatic door can be determined by analyzing the voiceprint feature of the sound signal of the sound source, determining the velocity of the sound source and determining the distance between the sound source and the automatic door. In this way, the times that the automatic door opens can be more accurately controlled, and a frequency of false detections of the automatic door can be reduced, so as to reduce power consumption of the automatic door and ease the traffic of the crowd.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE
EXEMPLARY EMBODIMENTS

Figure 1:
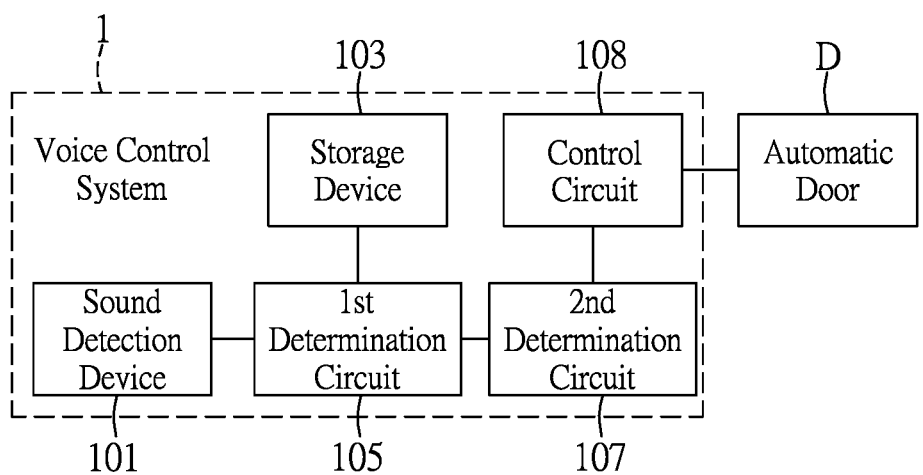
FIG. 1 is a functional block diagram of a voice control system according to a first embodiment of the present disclosure.

FIG. 1 is a functional block diagram of a voice control system according to a first embodiment of the present disclosure. As shown in FIG. 1, a voice control system 1 is used to control an automatic door D, and the voice control system 1 includes a sound detection device 101, a storage device 103, a first determination circuit 105, a second determination circuit 107 and a control circuit 108. The sound detection device 101 detects a sound signal of a sound source and is electrically connected to the first determination circuit 105, the storage device 103 is electrically connected to the first determination circuit 105, the first determination circuit 105 is electrically connected to the second determination circuit 107, the second determination circuit 107 is electrically connected to the control circuit 108, and the control circuit 108 is electrically connected to the automatic door D.

For example, the sound detection device 101 may be a microphone array, and the microphone array includes multiple microphones that are arranged at intervals from one another. The microphone array can be mounted on the top of the automatic door D, and a detection range of the microphone array may be within 4 meters. In general, the microphone array normally operates in a sleep mode and is switched from the sleep mode to a working mode only when a sound source appears within the detection range.

Figure 2A:
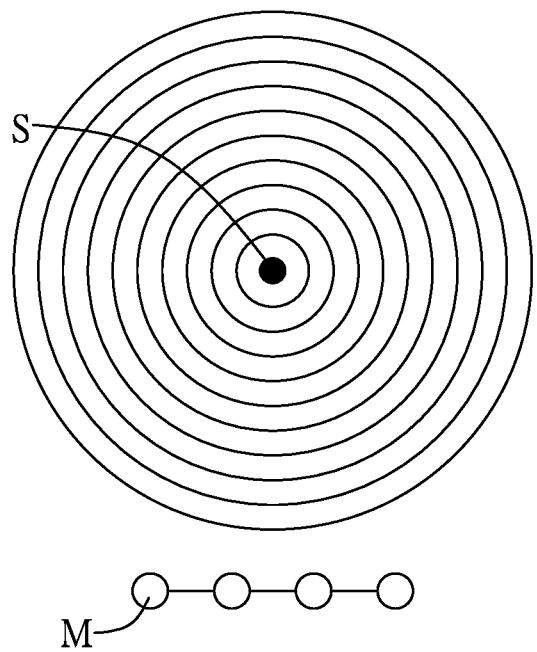
FIG. 2A is a schematic diagram showing a sound detection device detecting sound waves emitted by a stationary sound source.
Figure 2B:
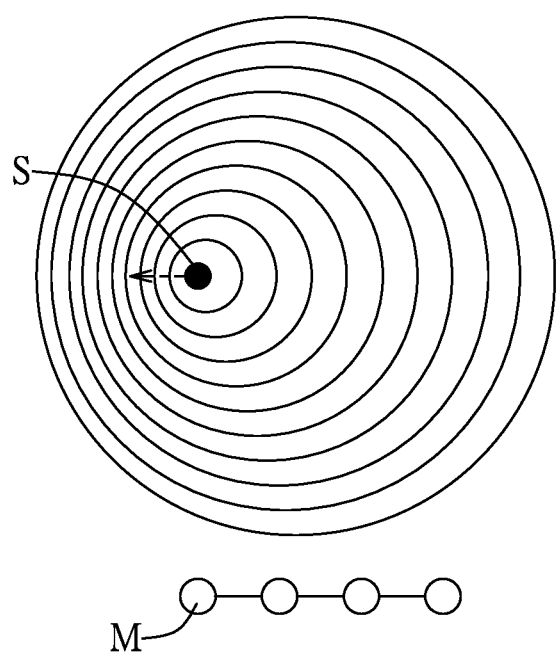
FIG. 2B is a schematic diagram of a sound detection device detecting sound waves emitted by a moving sound source.

FIG. 2A is a schematic diagram showing a sound detection device detecting sound waves emitted by a stationary sound source, and FIG. 2B is a schematic diagram of a sound detection device detecting sound waves emitted by a moving sound source. As shown in FIG. 2A, the sound detection device 101 is a microphone array, and the microphone array includes multiple microphones M that are arranged at intervals from one another. When a sound source S within the detection range is stationary, the frequencies of sound signals received by the microphones M are the same. As shown in FIG. 2B, when the sound source S within the detection range is moving, the frequencies of the sound signals received by the microphones M that are relatively close to the sound source S are higher while the frequencies of the sound signals received by the microphones M that are relatively far away from the sound source S are lower. Therefore, according to a frequency variation of the sound signal, whether the sound source S is in a moving state can be determined, and a motion direction of the sound source S can be evaluated.

Reference is made to FIG. 1 again, the storage device 103 may be, for example, a non-volatile memory or a hard disk. The storage device 103 is configured to store a voiceprint database, and the voiceprint database includes multiple reference voiceprint features. For example, the reference voiceprint features may include voiceprint features of footsteps of walking and running men in different ages and voiceprint features of footsteps of walking and running women in different ages.

The sound detection device 101 can transmit the detected sound signal to the first determination circuit 105, and the first determination circuit 105 analyzes a voiceprint feature of the detected sound signal and compares the voiceprint feature with the reference voiceprint features in the storage device 103, so as to determine whether or not the voiceprint feature matches one of the reference voiceprint features. When the first determination circuit 105 determines that the voiceprint feature of the sound signal matches one of the reference voiceprint features, the first determination circuit 105 transmits the sound signal to the second determination circuit 107. When the first determination circuit 105 determines that the voiceprint feature of the sound signal does not match any of the reference voiceprint features, the first determination circuit 105 determines that the sound signal is a noise.

After the second determination circuit 107 receives the sound signal, the second determination circuit 107 determines whether or not the velocity of the sound source falls within the reference speed range according to the frequency variation of the sound signal. In response to the velocity of the sound source within the reference speed range, the control circuit 108 controls the automatic door D to be in an open state. For example, the reference speed range is set from 0.5 m/s to 0.7 m/s; when the velocity of the sound source is 0.6 m/s, the second determination circuit 107 then determines that the velocity of the sound source falls within the reference speed range, and the control circuit 108 controls the automatic door D to be in the open state. There are two cases in which the automatic door D is in the open state. The first case is when a current state of the automatic door D is "open", the automatic door D remains in the current state. In the second case, when the current state of the automatic door D is "closed", the control circuit 108 controls the automatic door D to switch from a close state to the open state.

Figure 3:
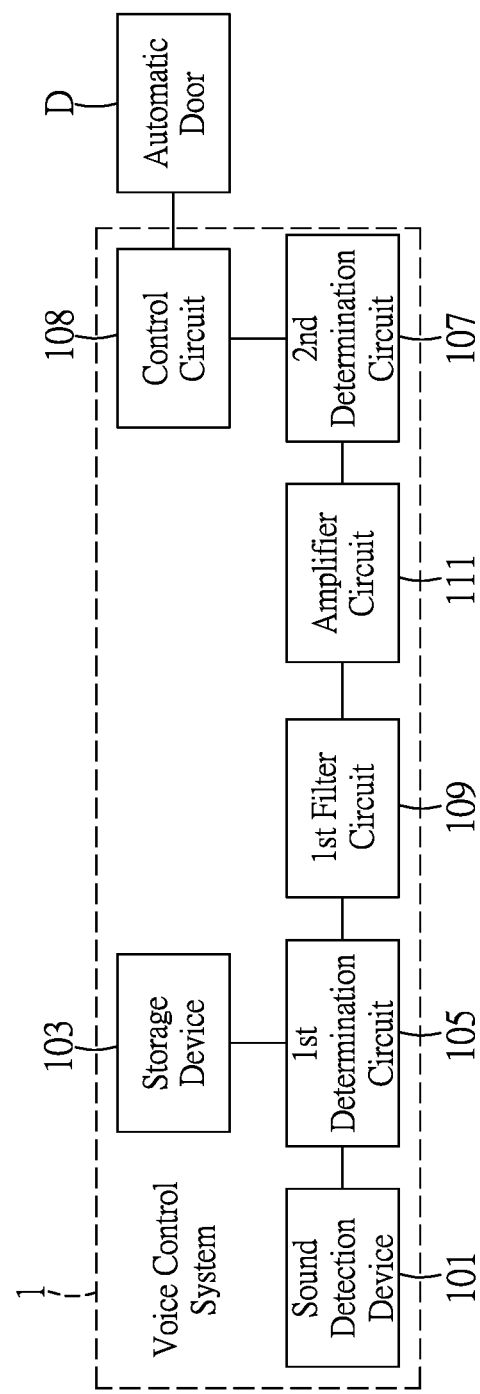
FIG. 3 is a functional block diagram of a voice control system according to a second embodiment of the present disclosure.

FIG. 3 is a functional block diagram of a voice control system according to a second embodiment of the present disclosure. As shown in FIG. 3, the voice control system 1 further includes a first filter circuit 109 and an amplifier circuit 111. The first filter circuit 109 is electrically connected to an output of the first determination circuit 105, and the amplifier circuit 111 is electrically connected to an output of the first filter circuit 109. In response to the voiceprint feature of the sound source matching one of the reference voiceprint features, the first determination circuit 105 outputs the sound signal to the first filter circuit 109, and then the first filter circuit 109 performs a noise cancellation process on the sound signal. The first filter circuit 109 outputs the noise-free sound signal to the amplifier circuit 111, and the amplifier circuit 111 performs an amplification process on the sound signal, so as to enhance the voiceprint feature of the sound signal. An output of the amplifier circuit 111 is electrically connected to the second determination circuit 107.

Figure 4:
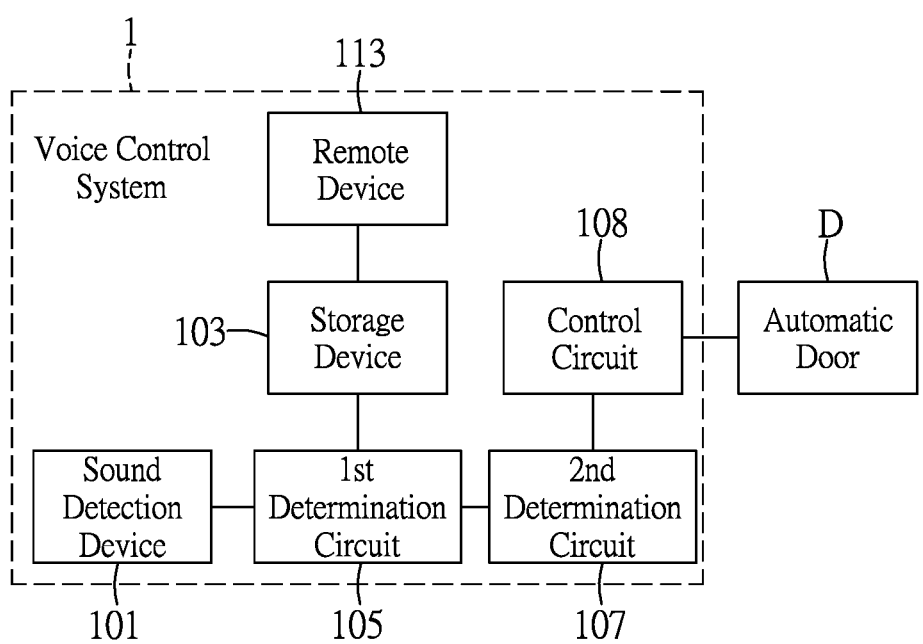
FIG. 4 is a functional block diagram of a voice control system according to a third embodiment of the present disclosure.

FIG. 4 is a functional block diagram of a voice control system according to a third embodiment of the present disclosure. As shown in FIG. 4, the voice control system 1 further includes a remote device 113, and the remote device 113 is, for example, a cloud host or a mobile communication device. The remote device 113 is electrically connected to the storage device 103 in a wired or wireless manner. The remote device 113 is connected to multiple external voiceprint feature databases through a network, such that the remote device 113 can periodically update the voiceprint database in the storage device 103 according to the external voiceprint feature databases. In other embodiments, the storage device 103 can also be disposed in the remote device 113 and electrically connected to the first determination circuit 105 in a wired or wireless manner.

Figure 5:
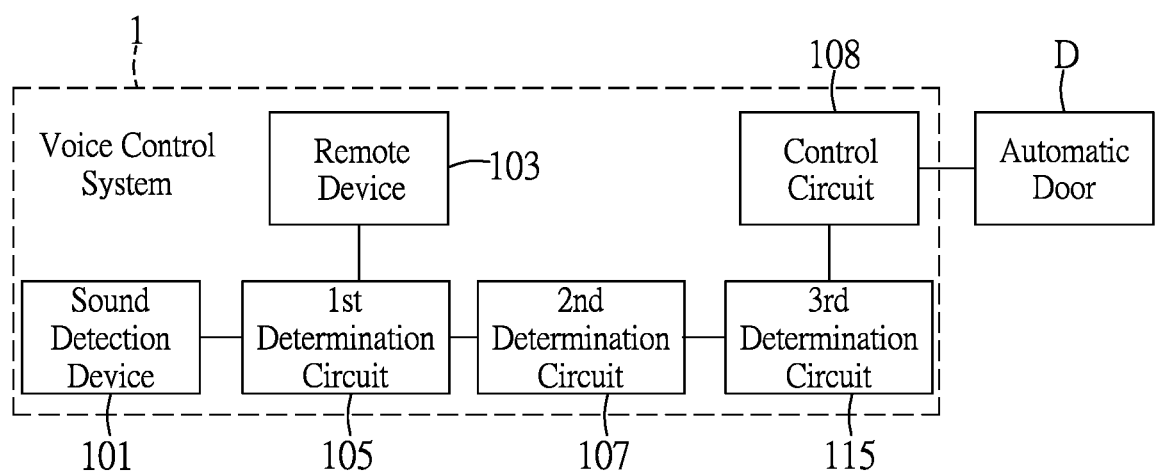
FIG. 5 is a functional block diagram of a voice control system according to a fourth embodiment of the present disclosure.

FIG. 5 is a functional block diagram of a voice control system according to a fourth embodiment of the present disclosure. As shown in FIG. 5, the voice control system 1 further includes a third determination circuit 115. The third determination circuit 115 is electrically connected to the second determination circuit 107 and the control circuit 108, and the control circuit 108 is electrically connected to the automatic door D. In response to the velocity of the sound source within the reference speed range, the second determination circuit 107 transmits the sound signal to the third determination circuit 115. After the third determination circuit 115 receives the sound signal, the third determination circuit 115 determines whether or not a distance between the sound source and the automatic door D is smaller than a reference distance according to the frequency variation of the sound signal. When the third determination circuit 115 determines that the distance between the sound source and the automatic door D is smaller than the reference distance, the control circuit 108 controls the automatic door D to be in the open state. There are two cases in which the control circuit 108 controls the automatic door D to be in the open state. The first case is when a current state of the automatic door D is "open", the automatic door D remains in the current state. In the second case, when the current state of the automatic door D is "closed", the control circuit 108 controls the automatic door D to switch from the close state to the open state.

Figure 6:
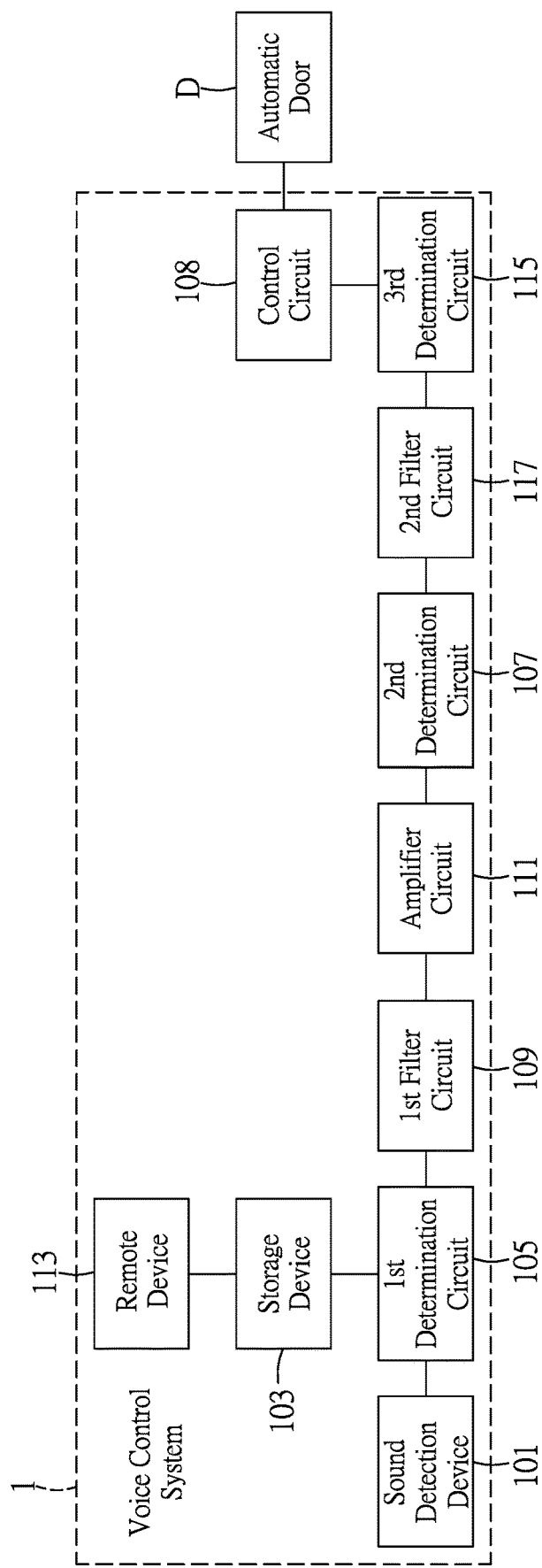
FIG. 6 is a functional block diagram of a voice control system according to a fifth embodiment of the present disclosure.

FIG. 6 is a functional block diagram of a voice control system according to a fifth embodiment of the present disclosure. As shown in FIG. 6, a voice control system 1 includes a sound detection device 101, a storage device 103, a first determination circuit 105, a second determination circuit 107, a control circuit 108, a first filter circuit 109, an amplifier circuit 111, a remote device 113, a third determination circuit 115 and a second filter circuit 117. The sound detection device 101 is electrically connected to the first determination circuit 105, and the storage device 103 is electrically connected to the first determination circuit 105 and the remote device 113. An output of the first determination circuit 105 is electrically connected to an input of the first filter circuit 109, and an output of the first filter circuit 109 is electrically connected to the amplifier circuit 111. An input terminal of the second determination circuit 107 is electrically connected to an output of the amplifier circuit 111, and the second determination circuit 107 is electrically connected to the second filter circuit 117. The third determination circuit 115 is electrically connected to the second filter circuit 117 and the control circuit 108, and the control circuit 108 is electrically connected to the automatic door D. That is, the second determination circuit 107 is indirectly connected to the control circuit 108 through the second filter circuit 117 and the third determination circuit 115.

When the first determination circuit 105 determines that the voiceprint feature of the sound signal of the sound source matches one of the reference voiceprint features, the first determination circuit 105 outputs the sound signal to the first filter circuit 109, and then the first filter circuit 109 performs the noise cancellation process on the sound signal. After the sound signal is filtered by the first filter circuit 109, the amplifier circuit 111 further performs the amplification process on the noise-free sound signal. The amplifier circuit 111 transmits the amplified sound signal to the second determination circuit 107, and then the second determination circuit 107 determines whether or not the velocity of the sound source falls within the reference speed range according to the frequency variation of the sound signal.

In response to the velocity of the sound source within the reference speed range, the second determination circuit 107 outputs the sound signal to the second filter circuit 117. Next, the second filter circuit 117 performs the noise cancellation process on the sound signal, and transmits the noise-free sound signal to the third determination circuit 115. The third determination circuit 115 determines whether or not the distance between the sound source and the automatic door D is less than the reference distance according to the frequency variation of the sound signal. When the third determination circuit 115 determines that the distance between the sound source and the automatic door D is less than the reference distance, the control circuit 108 controls the automatic door D to be in the open state.

Figure 7:
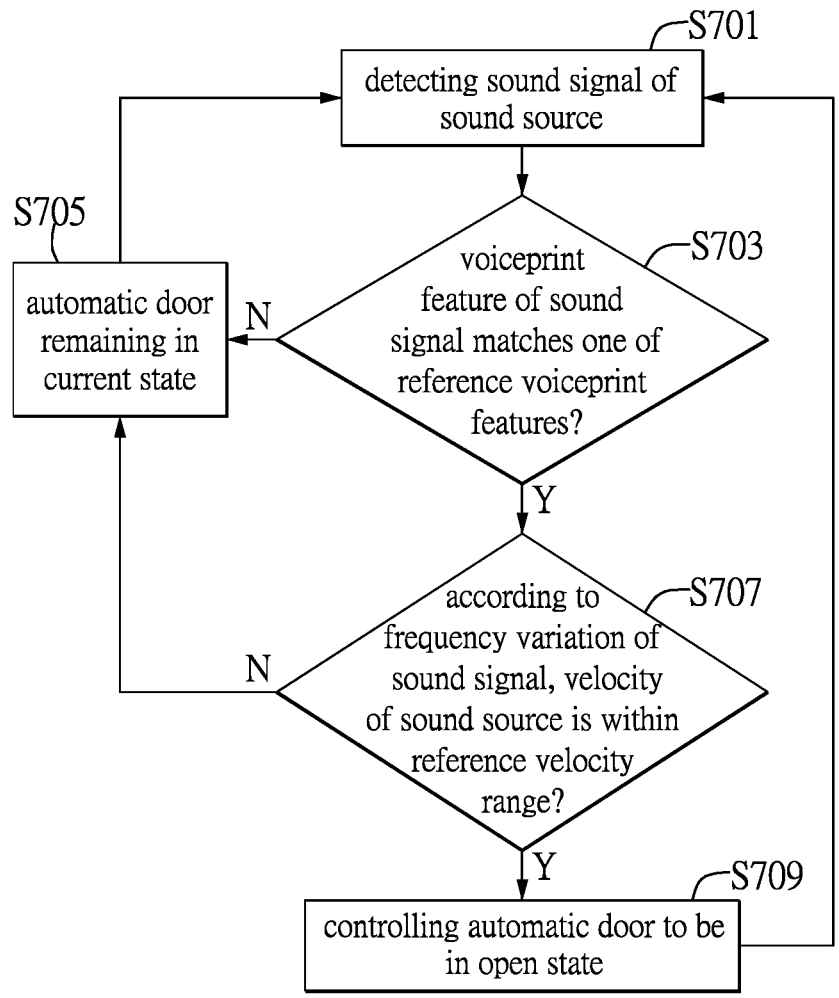
FIG. 7 is a flowchart of a voice control method according to the first embodiment of the present disclosure.

FIG. 7 is a flowchart of a voice control method according to the first embodiment of the present disclosure. As shown in FIG. 7, in step S701, the sound signal of the sound source is detected, and then the voice control method proceeds to step S703. In step S703, it is determined whether or not the voiceprint feature of the sound signal matches one of the reference voiceprint features.

For example, the storage device 103 stores a first reference voiceprint feature, and the first reference voiceprint feature is a voiceprint feature of footsteps of a 20-to-30-year-old male walking. For example, when a 27-year-old man walks towards the automatic door, and the sound detection device 101 detects his footsteps within the detection range, the first determination circuit 105 obtains the voiceprint feature of the footsteps of the walking man and compares the obtained voiceprint feature with the first reference voiceprint feature, the first determination circuit 105 can then determine that the voiceprint feature of the footsteps of the walking man matches the first reference voiceprint feature in the storage device 103.

When the voiceprint feature of the sound signal does not match any of the reference voiceprint features, the voice control method proceeds to step S705. In step S705, the automatic door remains in the current state, and the voice control method returns to step S701.

In response to the voiceprint feature of the sound signal matching one of the reference voiceprint features, the voice control method proceeds to step S707. In step S707, it is determined whether or not the velocity of the sound source falls within the reference speed range according to the frequency variation of the sound signal. In response to the velocity of the sound source out of the reference speed range, the voice control method returns to step S705.

In response to the velocity of the sound source within the reference speed range, the voice control method proceeds to step S709. In step S709, the automatic door is controlled to be in the open state, and the voice control method returns to step S701. In detail, when the current state of the automatic door is "open", the current state of the automatic door remains unchanged. When the current state of the automatic door is "closed", the automatic door is opened.

The voice control method of FIG. 7 can be implemented through the voice control system of FIG. 1, but the present disclosure is not limited thereto. The step S701 is executed by the sound detection device 101; the step S703 is executed by the first determination circuit 105; and the step S707 is executed by the second determination circuit 107.

Figure 8:
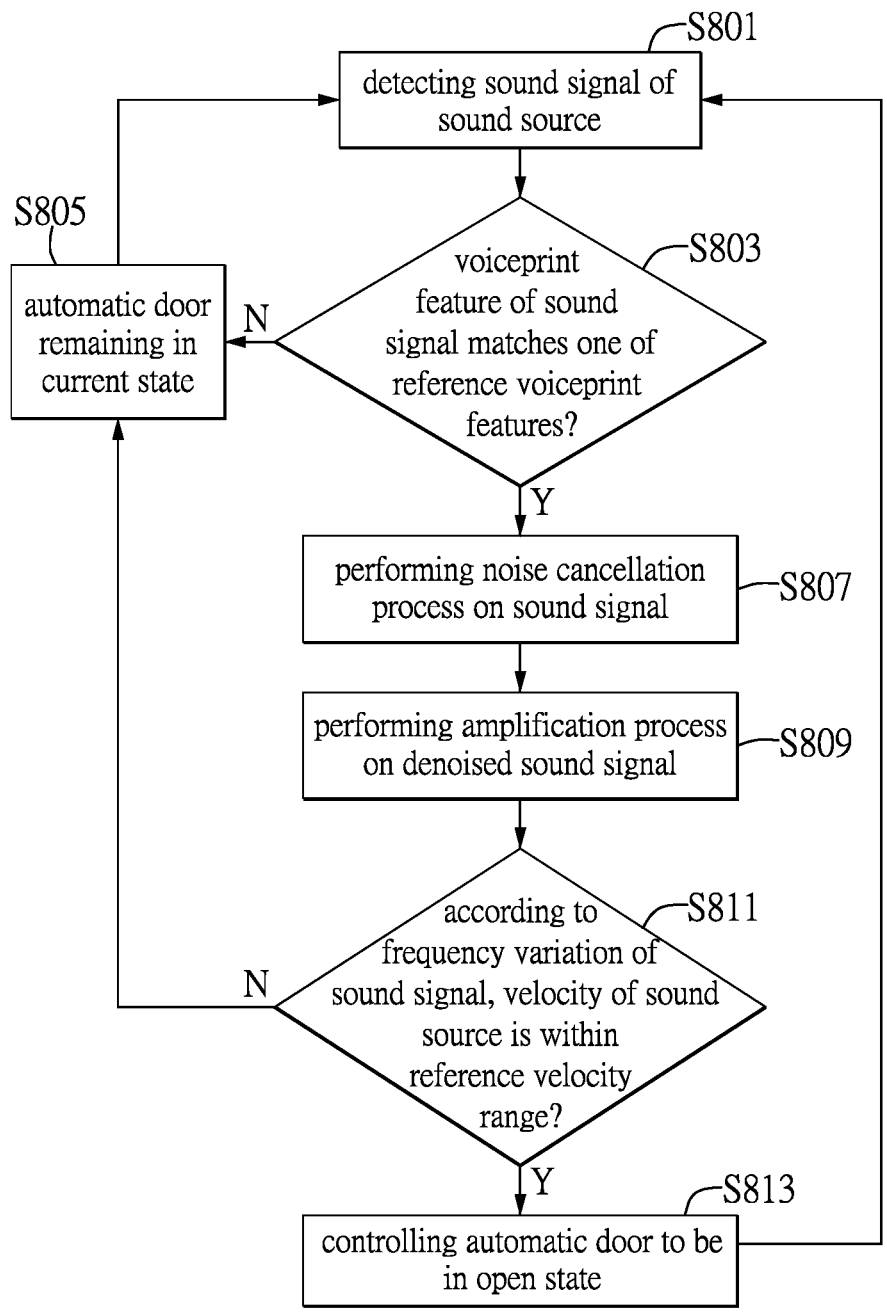
FIG. 8 is a flowchart of a voice control method according to the second embodiment of the present disclosure.

FIG. 8 is a flowchart of a voice control method according to the second embodiment of the present disclosure, and the voice control method of FIG. 8 includes steps S801 to S813. A difference between the voice control method of FIG. 8 and the voice control method of FIG. 7 is presented in steps S807 and S809, and the details of steps S801 to S813 are described as follows.

In step S801, the sound signal of the sound source is detected, and then the method proceeds to step S803. In step S803, it is determined whether or not the voiceprint feature of the sound signal matches one of the reference voiceprint features. When the voiceprint feature of the sound signal does not match one of the reference voiceprint features, the method proceeds to step S805. In step S805, the automatic door remains in the current state, and the method returns to step S801. In response to the voiceprint feature of the sound signal matching one of the reference voiceprint features, the method proceeds to step S807.

In step S807, the noise cancellation process is performed on the sound signal, and the method proceeds to step S809. In step S809, the amplification process is performed on the noise-free sound signal.

After step S809, the method proceeds to step S811. In step S811, it is determined whether or not the velocity of the sound source falls within the reference speed range according to the frequency variation of the sound signal. In response to the velocity of the sound source out of the reference speed range, the method returns to step S805. In response to the velocity of the sound source within the reference speed range, the method proceeds to step S813. In step S813, the automatic door is controlled to be in the open state, and the method returns to step S801.

The voice control method of FIG. 8 can be executed by the voice control system of FIG. 3, but the present disclosure is not limited thereto. Step S801 is executed by the sound detection device 101; step S803 is executed by the first determination circuit 105; step S807 is executed by the first filter circuit 109, step S809 is executed by the amplifier circuit 111; and step S811 is executed by the second determination circuit 107.

Figure 9:
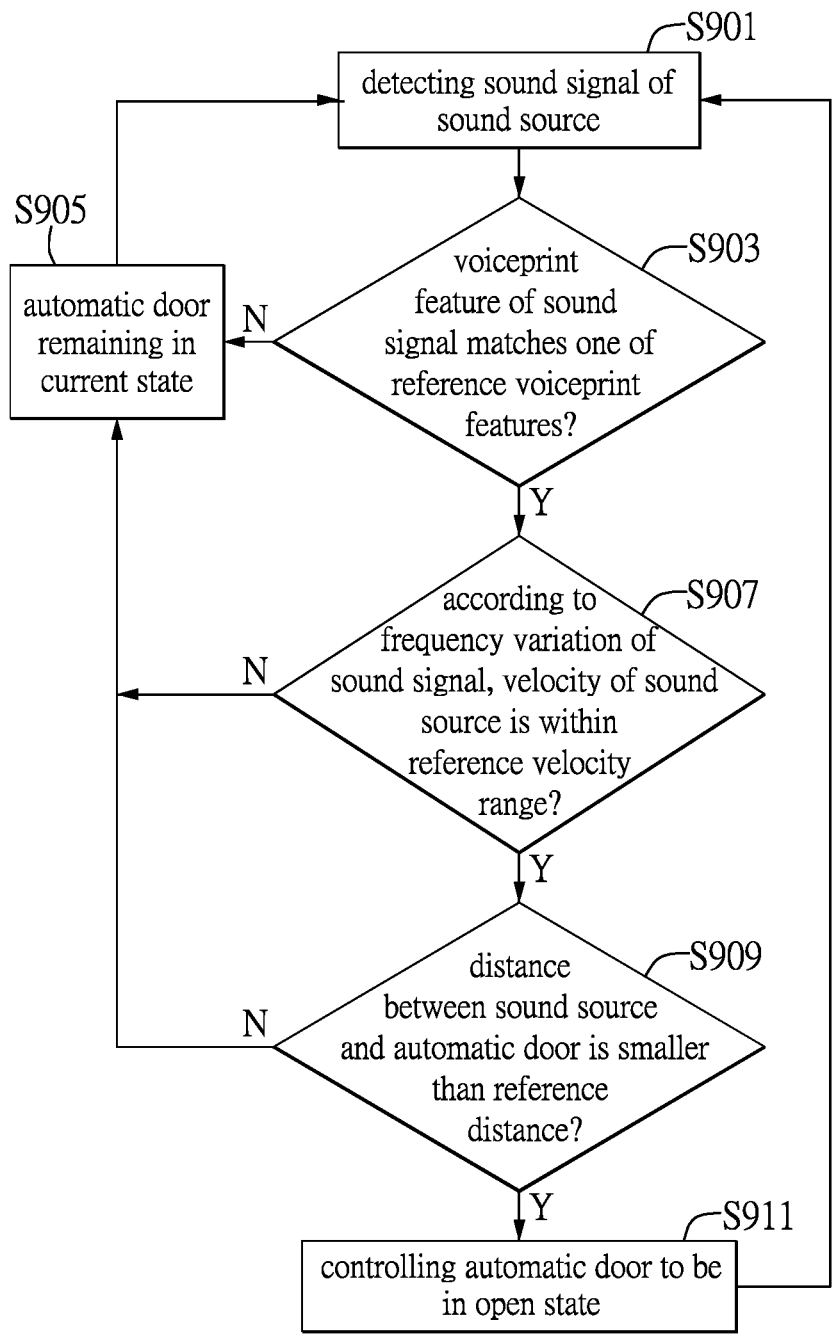
FIG. 9 is a flowchart of a voice control method according to the third embodiment of the present disclosure.

FIG. 9 is a flowchart of a voice control method according to the third embodiment of the present disclosure, and the voice control method of FIG. 8 includes steps S901 to S911. A difference between the voice control method of FIG. 9 and the voice control method of FIG. 7 lies in step S909, and the details of steps S901 to S911 are described as follows.

In step S901, the sound signal of the sound source is detected, and then the method proceeds to step S903. In step S903, it is determined whether or not the voiceprint feature of the sound signal matches one of the reference voiceprint features. When the voiceprint feature of the sound signal does not match any of the reference voiceprint features, the method proceeds to step S905. In step S905, the automatic door remains in the current state, and the method returns to step S901. In response to the voiceprint feature of the sound signal matching one of the reference voiceprint features, the voice control method proceeds to step S907.

In step S907, it is determined whether or not the velocity of the sound source falls within the reference speed range according to the frequency variation of the sound signal. In response to the velocity of the sound source out of the reference speed range, the method returns to step S905. In response to the velocity of the sound source within the reference speed range, the method proceeds to step S909. In step S909, it is determined whether or not the distance between the sound source and the automatic door is smaller than the reference distance. In response to the distance between the sound source and the automatic door less than the reference distance, the method proceeds to step S911. In step S911, the automatic door is controlled to be in the open state, and then the method returns to step S901. In response to the distance between the sound source and the automatic door equal to or greater than the reference distance, the method proceeds to step S905.

The voice control method of FIG. 9 can be implemented by the voice control system of FIG. 5, but the present disclosure is not limited thereto. Step S901 is executed by the sound detection device 101; step S903 is executed by the first determination circuit 105; step S907 is executed by the second determination circuit 107; and step S909 is executed by the third determination circuit 115.

Figure 10:
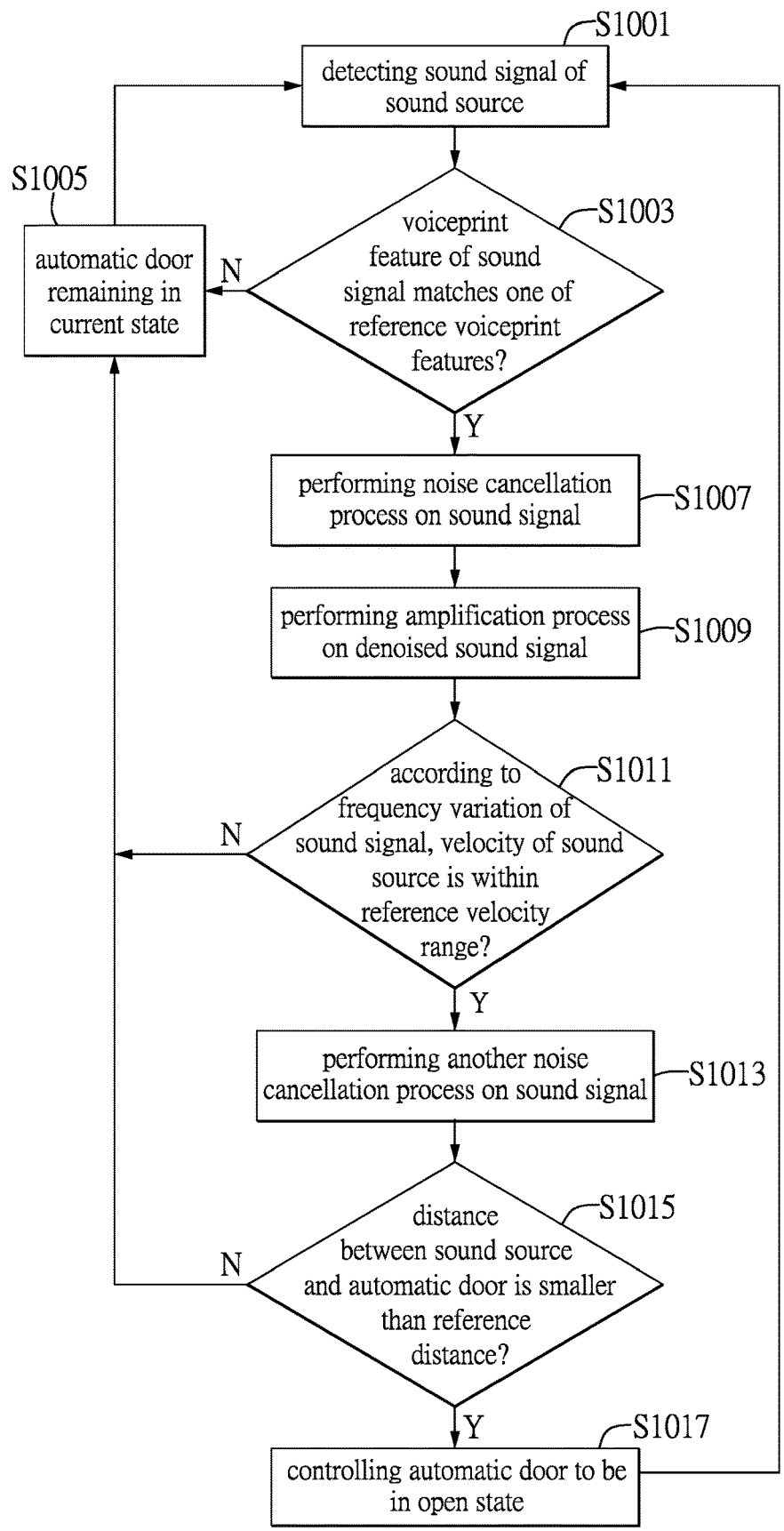
FIG. 10 is a flowchart of a voice control method according to the fourth embodiment of the present disclosure.

FIG. 10 is a flowchart of a voice control method according to the fourth embodiment of the present disclosure, and the voice control method of FIG. 8 includes steps S1001 to S1017. A difference between the voice control method of FIG. 10 and the voice control method of FIG. 9 lies in steps S1007, S1009 and S1013, and the details of steps S1001 to S1017 are described as follows.

In step S1001, the sound signal of the sound source is detected, and then the method proceeds to step S1003. In step S1003, it is determined whether or not the voiceprint feature of the sound signal matches one of the reference voiceprint features. When the voiceprint feature of the sound signal does not match any of the reference voiceprint features, the voice control method proceeds to step S1005. In step S1005, the automatic door remains in the current state, and the voice control method returns to step S1001. In response to the voiceprint feature of the sound signal matching one of the reference voiceprint features, the voice control method proceeds to step S1007.

In step S1007, the noise cancellation process is performed on the sound signal, and the method proceeds to step S1009. In step S1009, the amplification process is performed on the noise-free sound signal.

After step S1009, the method proceeds to step S1011. In step S1011, it is determined whether or not the velocity of the sound source falls within the reference speed range according to the frequency variation of the sound signal. In response to the velocity of the sound source out of the reference speed range, the method returns to step S1005. In response to the velocity of the sound source within the reference speed range, the method proceeds to step S1013.

In step S1013, another noise cancellation process is performed on the sound signal, and the method proceeds to step S1015. In step S1015, it is determined whether or not the distance between the sound source and the automatic door is smaller than the reference distance. In response to the distance between the sound source and the automatic door less than the reference distance, the method proceeds to step S1017. In step S1017, the automatic door is controlled to be in the open state, and then the method returns to step S1001. In response to the distance between the sound source and the automatic door equal to or greater than the reference distance, the method proceeds to step S1005.

The voice control method of FIG. 10 can be implemented by the voice control system of FIG. 6, but the present disclosure is not limited thereto. Step S1001 is executed by the sound detection device 101; step S1003 is executed by the first determination circuit 105; step S1007 is executed by the first filter circuit 109, step S1009 is executed by the amplifier circuit 111; step S1011 is executed by the second determination circuit 107; step S1013 is performed by the second filter circuit 117; and step S1015 is performed by the third determination circuit 115.

Beneficial Effects of the Embodiments

In conclusion, in the voice control system and the voice control method provided by the present disclosure, whether to open the automatic door or not can be determined by analyzing the voiceprint feature of the sound signal of the sound source, determining the velocity of the sound source and determining the distance between the sound source and the automatic door. In this way, the times that the automatic door is opened can be more accurately controlled, and a frequency of false detections of the automatic door can be reduced, so as to reduce power consumption of the automatic door and ease the traffic of the crowd.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A voice control system for an automatic door, the voice control system comprising:
    a sound detection device configured to detect a sound signal of a sound source;
    a storage device comprising a voiceprint database, wherein the voiceprint database comprises a plurality of reference voiceprint features;
    a first determination circuit electrically connected to the storage device and the sound detection device, wherein the first determination circuit is configured to analyze a voiceprint feature of the sound signal and compare the voiceprint feature with the reference voiceprint features, so as to determine whether or not the voiceprint feature matches one of the reference voiceprint features;
    a second determination circuit electrically connected to the first determination circuit, wherein the second determination circuit is configured to determine whether or not a velocity of the sound source falls within a reference speed range according to a frequency variation of the sound signal that matches at least one of the reference voiceprint features; and
    a control circuit electrically connected to the second determination circuit, wherein, in response to the velocity of the sound source within the reference speed range, the control circuit controls the automatic door to be in an open state.

2. The voice control system according to claim 1, wherein the sound detection device is a microphone array that comprises a plurality of microphones, and the microphones are arranged at intervals from one another.

3. The voice control system according to claim 1, further comprising a filter circuit and an amplifier circuit, wherein the filter circuit is electrically connected to the first determination circuit, and the amplifier circuit is electrically connected to the filter circuit.

4. The voice control system according to claim 1, further comprising a remote device, wherein the remote device is electrically connected to the storage device, and the remote device periodically updates the voiceprint database.

5. The voice control system according to claim 1, further comprising:
    a third determination circuit electrically connected to the second determination circuit and the control circuit, wherein, in response to the velocity of the sound source within the reference speed range, the third determination circuit is configured to determine whether or not a distance between the sound source and the automatic door is less than a reference distance according to the frequency variation of the sound signal, and in response to the distance between the sound source and the automatic door less than the reference distance, the control circuit controls the automatic door to be in the open state.

6. A voice control method for an automatic door, the voice control method comprising:
    detecting a sound signal of a sound source;
    determining whether or not a voiceprint feature of the sound signal matches one of a plurality of reference voiceprint features;
    in response to the voiceprint feature of the sound signal matching at least one of the reference voiceprint features, determining whether or not a velocity of the sound source falls within a reference speed range according to a frequency variation of the sound signal; and
    in response to the velocity of the sound source within the reference speed range, controlling the automatic door to be in an open state.

7. The voice control method according to claim 6, further comprising:
    before determining whether or not the velocity of the sound source is within the reference speed range according to the frequency variation of the sound signal in response to the voiceprint feature of the sound signal matching at least one of the reference voiceprint features, performing a noise cancellation process and an amplification process on the sound signal of the sound source.

8. The voice control method according to claim 6, further comprising:
    in response to the velocity of the sound source within the reference speed range, determining whether or not a distance between the sound source and the automatic door is less than a reference distance according to the frequency variation of the sound signal; and
    in response to the distance between the sound source and the automatic door less than the reference distance, controlling the automatic door to be in the open state.

9. The voice control method according to claim 6, further comprising:
    before determining whether or not the distance between the sound source and the automatic door is less than the reference distance according to the frequency variation of the sound signal in response to the velocity of the sound source within the reference speed range, performing a noise cancellation process on the sound signal of the sound source.

* * * * *